United States Patent
Ogino et al.

(10) Patent No.: US 6,731,905 B2
(45) Date of Patent: May 4, 2004

(54) FIXED WIRELESS ACCESS SYSTEM AND APPARATUS THEREFOR

(75) Inventors: Atsushi Ogino, Kodaira (JP); Hideya Suzuki, Ichikawa (JP); Tomoaki Ishifuji, Tokyo (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 09/801,728

(22) Filed: Mar. 9, 2001

(65) Prior Publication Data

US 2002/0032031 A1 Mar. 14, 2002

(30) Foreign Application Priority Data

Sep. 11, 2000 (JP) ......................................... 2000-280140

(51) Int. Cl.$^7$ ................................................. H04B 7/15
(52) U.S. Cl. ............................. 455/11.1; 455/7; 455/16
(58) Field of Search ........................... 455/7, 11.1, 561, 455/562, 554.2, 435.1, 435.2, 435.3, 13.1, 16; 342/81, 90, 353, 357.1, 359, 360

(56) References Cited

U.S. PATENT DOCUMENTS

| | | | |
|---|---|---|---|
| 5,481,539 A | * 1/1996 | Hershey et al. | ............. 370/312 |
| 5,689,802 A | 11/1997 | Luzzatto | |
| 5,850,593 A | 12/1998 | Uratani | |
| 5,890,054 A | 3/1999 | Logsdon et al. | |
| 5,907,540 A | 5/1999 | Hayashi | |
| 5,950,113 A | 9/1999 | Meihofer | |
| 6,044,268 A | * 3/2000 | Haartsen | ..................... 370/294 |
| 6,493,545 B1 | * 12/2002 | Sugaya | ........................ 455/272 |
| 6,545,995 B1 | * 4/2003 | Kinnunen et al. | .......... 370/341 |

FOREIGN PATENT DOCUMENTS

| | | |
|---|---|---|
| BE | 0689303 A * | 12/1995 |
| EP | 0 701 337 A2 A3 | 9/1995 |
| GB | 2 326 059 | 6/1997 |
| GB | 2 346 511 | 12/1999 |
| JP | 11-243362 | 9/1999 |
| WO | WO 99/03216 | 7/1998 |
| WO | WO 00/24141 | 10/1999 |

OTHER PUBLICATIONS

Search report from European Patent Office dated Aug. 8, 2003.
Association of Radio Industries and Business, Fixed Wireless Access System Using Quasi Millimeter Wave and Millimeter Wave Band Frequencies Point to Multipoint System, ARIB STD–T59, Issue 1.0, Mar. 30, 1999.
Nikkei Communication, issue Sep. 6, 1999, pp. 106–112.
European Search Report dated Nov. 3, 2003.

* cited by examiner

*Primary Examiner*—Charles Appiah
*Assistant Examiner*—Nghi H. Ly
(74) *Attorney, Agent, or Firm*—Reed Smith LLP; Stanley P. Fisher, Esq.; Juan Carlos A. Marquez, Esq.

(57) ABSTRACT

In a P-MP fixed wireless access system using quasi-millimeter and millimeter wave bands, a relaying path is autonomously set up for subscriber stations without the need for additional provision of a repetition radio circuit using a costly MMIC. A subscriber station in the fixed wireless access system is provided with a repeating function for relaying signals between a different subscriber station and a base station, a buffer memory for temporarily storing signals to be communicated therebetween, and a table for registering information for identifying a relaying path between an own reference wireless station and a lower-level subscriber station for signal repetition. The base station is provided with a table in which, in order to perform signal communication with an arbitrary subscriber registered in the base station, routing information is registered for determining whether or not to set up a relaying path via a different subscriber station registered in the base station.

6 Claims, 5 Drawing Sheets

FIXED WIRELESS ACCESS SYSTEM AND APPARATUS THEREFOR

BACKGROUND OF THE INVENTION

1. Field of the Invention

The present invention relates to a fixed wireless access system, and more particularly to a P-MP (point-to-multipoint communication) system using frequencies of quasi-millimeter and millimeter wave bands, configurations of base and subscriber stations constituting the P-MP system, and a method of use thereof.

2. Description of the Related Art

In a fixed wireless access system for radio communication between a base station installed by a telecommunications carrier and a subscriber station at each user's premises (refer to Nikkei Communication issued Sep. 6, 1999, pp. 106 to 112, for example), a wide frequency range is available in quasi-millimeter and millimeter wave bands. The fixed wireless access system is therefore expected to provide high-speed access lines at low charge. In particular, a conventional P-MP system, which is a type of fixed wireless access system (refer to ARIB, Association of Radio Industries and Businesses, STD-T59 Issue 1.0), is designed for connecting a base station and tens to hundreds of subscriber stations on a point-to-multipoint basis with the intention of providing services to SOHOs (small offices/home offices) and individual users. For implementation of the P-MP fixed wireless access system using quasi-millimeter and millimeter wave bands, it is required to ensure a line-of-sight communication path between the base station and each subscriber station. As a technique for ensuring line-of-sight communication, an antenna may be installed at an elevated position or a repeater may be used. However, because of a substantial increase in cost, the installation of an antenna at an elevated position or the use of a repeater is economically disadvantageous. For a wireless telephone system bearing a close resemblance to the above situation, a wireless telephone apparatus having a repeating function is disclosed as a low-cost repeating facility in Japanese Unexamined Patent Publication No. H11 (1999)-243362.

With reference to FIG. 1, the wireless telephone apparatus having a repeating function is described below. As shown in FIG. 1, a wireless telephone apparatus 90 comprises a first radio circuit 91 including a first receiver 95 and a second transmitter 96, and a second radio circuit 92 including a second receiver 97 and a first transmitter 98. For employing the wireless telephone apparatus 90 as telephone equipment for direct communication with a base station, the first radio circuit is made active. For employing the wireless telephone apparatus 90 as wireless telephone repeating equipment, the wireless telephone apparatus 90 is located at a place suitable for relaying communication and then a repeating function start switch thereof (not shown) is turned on. In the latter case, the first receiver 95 and the first transmitter 98 are used for relaying radio signals from the base station to a different wireless telephone apparatus, and the second receiver 97 and the second transmitter 96 are used for relaying radio signals from the different wireless telephone apparatus to the base station. For employing the wireless telephone apparatus 90 as wireless telephone equipment for communication with another wireless telephone apparatus serving as a repeater, the second radio circuit 92 is used.

In the conventional P-MP fixed wireless access system using quasi-millimeter and millimeter wave bands, wherein such a wireless telephone apparatus having a repeating function as mentioned above is employed as a subscriber station for the purpose of providing an additional feature, the following disadvantages are involved:

(1) No means for judging whether or not to use the repeating function is disclosed. It is therefore required to perform a manual operation, causing inefficient communication.

(2) An RF module for use in quasi-millimeter and millimeter wave bands comprises an MMIC (monolithic microwave integrated circuit), which is still high-priced. In addition, a plurality of transmitter-receiver radio circuits for relaying signals in transmission and reception must be provided in a subscriber station, resulting in an increase in cost.

(3) In the ARIB STD-T59 Issue 1.0, the use of a directional antenna at a subscriber station is specified as a mandatory requirement. However, no means for forming a judgment on orientation of the antenna is disclosed, and there arises inefficiency in communication where a manual operation is necessary.

SUMMARY OF THE INVENTION

It is therefore a principal object of the present invention to provide a fixed wireless access system including a base station and a plurality of subscriber stations, each having a repeating function, wherein the subscriber station judges whether or not to repeat signals without user's intervention, and if it is judged that signal repetition is needed, an optimum relaying path and an optimum antenna are selected automatically, i.e., autonomous routing is set up.

Another object of the present invention is to provide a simple type of transmitter-receiver radio circuit for each subscriber station while achieving the above principal object.

In accomplishing these objects of the present invention and according to one aspect thereof, there is a fixed wireless access system in which a plurality of subscriber stations carry out communication via a base station and at least one of the subscriber stations has a repeating function for relaying signals between a different subscriber station and the base station, the fixed wireless access system comprising: an arrangement wherein the subscriber station having the repeating function judges whether or not to repeat signals, and if it is judged that signal repetition is needed, the subscriber station finds out an optimum relaying path and records the optimum relaying path while registering the same in an upper-level subscriber station; and an arrangement wherein, in order to perform signal communication with an arbitrary subscriber station registered in the base station, the base station holds routing information which is used for determining whether or not to set up a relaying path via a different subscriber station registered in the base station, and according to the routing information, the base station allocates control and communication channels to the subscriber station for signal communication therewith.

The subscriber station having the repeating function comprises a buffer memory for temporarily storing signals to be communicated between the different subscriber station and the base station, and a first table for registering at least information for identifying a relaying path between an own reference wireless station thereof and a lower-level subscriber station for signal repetition via the subscriber station.

According to a preferred embodiment of the present invention, there is provided a P-MP fixed wireless access system based on a time-division multiple-access scheme in which the subscriber station having the repeating function comprises: a radio circuit capable of transmitting and receiving signals at the same frequency; a communication controller for identifying an incoming signal, for generating an outgoing signal, and for managing radio channels and an antenna to be used for transmission and reception; a timing controller for extracting a clock signal from the incoming signal to provide system synchronization; a receiving quality monitor for measuring reception quality of the incoming signal; an antenna selector for selecting an antenna to be used according to a selection signal issued from the communication controller; a plurality of directional antennas having respective directivities to different orientations; a buffer memory for temporarily storing signals to be communicated between the different subscriber station and the base station; a first table for registering information on a wireless station which serves as a clock supplier for the subscriber station when each of the plural directional antennas is used and for registering information for identifying a relaying path to a lower-level subscriber station for signal repetition via the subscriber station; a third table for recording a frame format; a first timer for indicating the upper limit of a period of searching for a wireless station serving as a clock supplier; a second timer for indicating the upper limit of a period of searching for a lower-level subscriber station to be connected with the subscriber station; and an interface controller for controlling input from and output to external input/output equipment.

Further, the base station comprises a radio circuit capable of transmitting and receiving signals at the same frequency; a communication controller for identifying an incoming signal, for generating an outgoing signal, and for managing radio channels; an antenna; a fourth table for recording a frame format for identifying each channel position and for recording a use status of each channel; an interface controller for controlling input from and output to external input/output equipment; and a second table in which information on each subscriber station is registered and in which, in order to perform signal communication with an arbitrary subscriber station registered in the base station, routing information is registered for determining whether or not to set up a relaying path via a different subscriber station registered in the base station.

In the present invention, the subscriber station having the repeating function may be a mobile telephone set or a stationary radio transmitter-receiver apparatus.

According to the present invention, in a fixed wireless access system in which a base station and a plurality of subscriber stations are provided with a radio circuit capable of transmitting and receiving signals at the same frequency, it is possible to implement a repeating function of each subscriber station in such a fashion that a judgment on whether or not to repeat signals is automatically formed using information regarding a condition of each subscriber station. Further, automatic re-routing can be performed in communication between the base station and an arbitrary subscriber station. The present invention is also applicable to a system including a plurality of subscriber stations each having a directional antenna. Therefore, since the repeating function of the subscriber station can be used readily, it is easy to expand a service area, contributing to a reduction in base station installation cost. Furthermore, according to the present invention, it is possible to readily cope with a failure in any subscriber station to be used as a repeater, and a new subscriber station can be installed with ease. Still further, since a subscriber station serving as a key relay point can be identified by the base station, differentiation in charging is implementable in an efficient fashion.

Still other feature and advantages of the present invention will become apparent to those of ordinary skilled in the art upon reading and understanding the following detailed description in conjunction with the accompanying drawings.

DETAILED DESCRIPTION OF THE PREFERRED EMBODIMENTS

Figure 1:
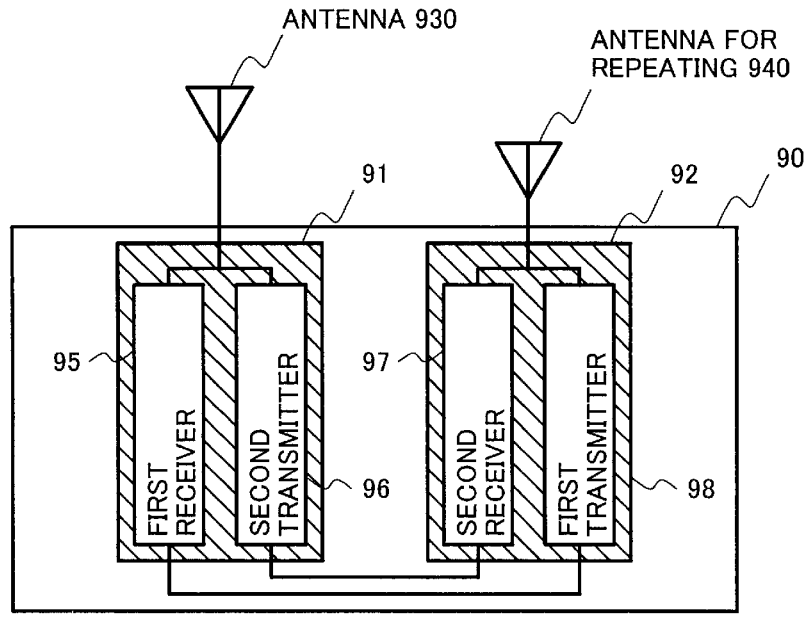
FIG. 1 is a block diagram showing a configuration of a conventional wireless telephone apparatus having a repeating function.
Figure 2:
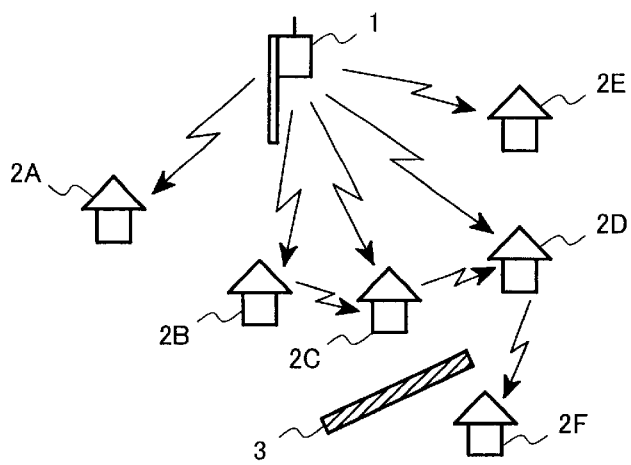
FIG. 2 is a system configuration diagram for explaining an example of a fixed wireless access system according to the present invention.

The present invention will now be described in detail by way of example with reference to the accompanying drawings. Referring to FIG. 2, there is shown a configuration of a fixed wireless access system in a preferred embodiment of the present invention. In FIG. 2, reference numeral 1 indicates a base station, reference numerals 2A, 2B, 2C, 2D, 2E and 2F indicate subscriber stations, and reference numeral 3 indicates an obstacle blocking a direct communication path between the base station 1 and the subscriber station 2F. The base station 1, and the subscriber stations 2A, 2B, 2C, 2D, 2E and 2F are generically referred to as wireless stations.

In a situation where the radio blocking obstacle 3 does not exist, each of the subscriber stations 2A to 2F can have direct access to the base station 1. By way of contrast, in a situation where the radio blocking obstacle 3 exists in a stationary or moving state between the base station 1 and each of the subscriber stations, the subscriber station cannot have direct access to the base station 1. For example, where the radio blocking obstacle 3 exists to prevent the subscriber station 2F from obtaining direct access to the base station 1 as shown in FIG. 2, the fixed wireless access system of the present invention allows the subscriber station 2F to make access to the base station 1 in the following manner: According to information regarding the arrangement of the subscriber stations and the base station 1, the operating condition of each subscriber station, the quality of radio signal reception, etc., the fixed wireless access system determines the most desirable relaying path using an autonomous routing function thereof. More specifically, any one of such relaying paths as 1-2A-2F, 1-2B-2F, 1-2B-2C-2D-2F, 1-2D-2F, and 1-2E-2F is selected as the most desirable relaying path for communication between the base station 1 and the subscriber station 2F.

In the following description, a subscriber station having direct access to the base station 1 is referred to as a direct access subscriber station, and a subscriber station having indirect access to the base station 1 via another subscriber station is referred to as an indirect access subscriber station. According to obstacle conditions and subscriber station operating conditions, each subscriber station is treated as a direct access subscriber station or an indirect access subscriber station. For example, where the subscriber station 2D is treated as a direct access subscriber station under normal condition, the subscriber station 2D may be assigned as an indirect access subscriber station on occurrence of a radio blocking obstacle between the base station 1 and the subscriber station 2D.

In the fixed wireless access system, it is required for each subscriber station to have system synchronization when making any access for communication. System synchronization signifies a condition that each subscriber station is in synchronization with the base station 1, and each subscriber station may have system synchronization by synchronizing itself with another subscriber station operating in synchronization with the base station 1. A wireless station serving as a direct clock supplier for each subscriber station is referred to as a reference wireless station, and a subscriber station using a certain wireless station as a direct or indirect clock supplier is referred to as a lower-level subscriber station belonging to the wireless station serving as a direct or indirect clock supplier. For example, in the system configuration shown in FIG. 2, when all the subscriber stations 2B, 2C, 2D and 2F are in system synchronization and a relaying path 1-2B-2C-2D-2F is set up between the base station 1 and the subscriber station 2F, the base station 1 serves as a reference wireless station for the subscriber station 2B, the subscriber station 2B serves as a reference wireless station for the subscriber station 2C, the subscriber station 2C serves as a reference wireless station for the subscriber station 2D, and subscriber station 2D serves as a reference wireless station for the subscriber station 2F.

In the fixed wireless access system of the present invention, if any subscriber station cannot use the base station directly as a reference wireless station due to the radio blocking obstacle 3 or the like, at least one of the subscriber stations 2A, 2B, 2C, 2D and 2E is used as a repeater station for connection to the base station 1. More specifically, any subscriber station used as a repeater station is not fixed, i.e., each subscriber station works dynamically so that an optimum relaying path can be established according to subscriber station operating conditions and obstacle conditions. Thus, autonomous routing is accomplished in the present invention.

In an instance where the radio blocking obstacle 3 exists as shown in FIG. 2, communication between the subscriber station 2F and the base station 1 may be carried out through any of the relaying paths 1-2B-2C-2D-2F, 1-2E-2F, 1-2D-2F, and 1-2B-2E-2F. If the subscriber station 2E is not active or an obstacle occurs between the base station 1 and the subscriber station 2E, either of the relaying paths 1-2B-2C-2D-2F and 1-2D-2F is selected according to the result of judgment on signal reception quality. For this purpose, in the fixed wireless access system of the present invention, each subscriber station comprises means for judging whether or not to repeat signals and means for automatically establishing an optimum relaying path if it judged that signal repetition is needed. For signal communication with an arbitrary subscriber station registered in the base station 1, the base station 1 comprises means for registering information to be used for determining whether or not to set up a relaying path via another subscriber station registered in the base station 1.

In the following description, as to signal repeating operation, a subscriber station located at a long distance from the base station 1 is referred to as a lower-level subscriber station, and a subscriber station located near the base station 1 is referred to as a higher-level subscriber station. For example, when a relaying path 1-2B-2C-2D-2F is taken, the subscriber station 2B is a higher-level subscriber station with respect to the subscriber station 2C, and the subscriber station 2D is a lower-level subscriber station with respect to the subscriber station 2C. The number of repeater stations involved in signal communication between each subscriber station and the base station 1 is defined as a subscriber station level. For example, in the system configuration shown in FIG. 2, when the relaying path 1-2B-2C-2D-2F is set up between the base station 1 and the subscriber station 2F, the subscriber station 2B has subscriber station level 0, the subscriber station 2C has subscriber station level 1, and the subscriber station 2D has subscriber station level 2.

A direct radio communication path from the base station 1 to each subscriber station is referred to as a downlink radio channel or simply as a downlink channel, and a communication path in the opposite direction is referred to as an uplink radio channel or simply as an uplink channel. Further, a communication path from a subscriber station serving as a repeater station for an indirect access subscriber station to the indirect access subscriber station is referred to as a downlink radio channel or simply as a downlink channel, and a communication path in the opposite direction is referred to as an uplink radio channel or simply as an uplink channel. Each of the uplink and downlink radio channels are generically referred to as a radio channel. Each radio channel is established through time-division multiplexing in a radio frequency band.

More specifically, the following three kinds of radio channels are provided. Note, however, that the present invention is not limited to the following description of these exemplary kinds of radio channels. In a modified embodiment of the present invention, a fewer kinds of channels may be provided by integrating channel functions. Further, in another modified embodiment, more kinds of channels may be provided by subdividing channel functions.

(1) Control channel: Used for such purposes as indicating a system clock time and a frame format, ringing a subscriber station at the time of call termination, responding to communication channel reservation at the time of call origination, and responding to control channel reservation requested by a subscriber station. The control channel is a downlink channel which is used for signal transmission from the base station 1 and each subscriber station serving as a repeater station.

(2) Communication channel: A bidirectional channel used for information transfer service between the base station 1 and each subscriber station.

(3) Reservation channel: An uplink channel used for reservation of the communication channel and control channel, for registration of each subscriber station, and for signal transmission from each subscriber station for such purposes as making communication/control channel reservation and relaying registration information.

A plurality of reservation channels having different levels are provided, and the number of reservation channels usable for transmission from each subscriber station is restricted according to a subscriber station level thereof.

Figure 3:
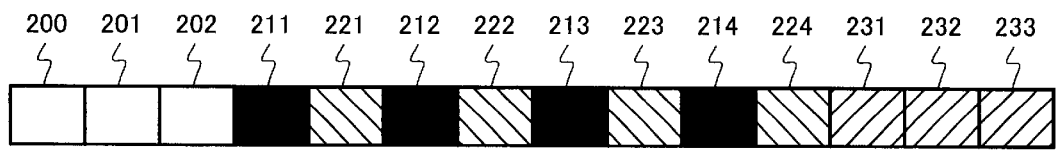
FIG. 3 is a diagram showing an example of a frame format structure used in the fixed wireless access system according to the present invention.

Referring to FIG. 3, there is shown an example of a frame format structure. In FIG. 3, a lapse of time is represented in the direction from left to right, i.e., the leftmost position indicates the top of a frame, and the rightmost position indicates the end thereof. Reference numerals 200, 201 and 202 indicate control channels. The topmost control channel of the frame is used for transmission from the base station 1. In allocation of control channels for transmission from subscriber stations serving as repeaters, a control channel nearer to the top of the frame is allocated to a subscriber station having a lower subscriber station level.

Reference numerals 211, 212, 213 and 214 indicate downlink communication channels. In allocation of downlink communication channels for transmission from subscriber stations, a downlink communication channel nearer to the top of the frame is allocated to a subscriber station having a lower subscriber station level. Reference numerals 221, 222, 223 and 224 indicate uplink communication channels. In allocation of uplink communication channels for transmission from subscriber stations, an uplink communication channel nearer to the top of the frame is allocated to a subscriber station having a higher subscriber station level.

Reference numerals 231, 232 and 233 indicate reservation channels. For transmission, a reservation channel nearer to the top of the frame is allocated to a subscriber station having a higher subscriber station level. To be more specific, for example, a subscriber station having subscriber station level 2 uses the reservation channel 231 for transmission, a subscriber station having subscriber station level 1 uses the reservation channel 232 for transmission, and a subscriber station having subscriber station level 0 uses the reservation channel 233 for transmission.

Figure 4:
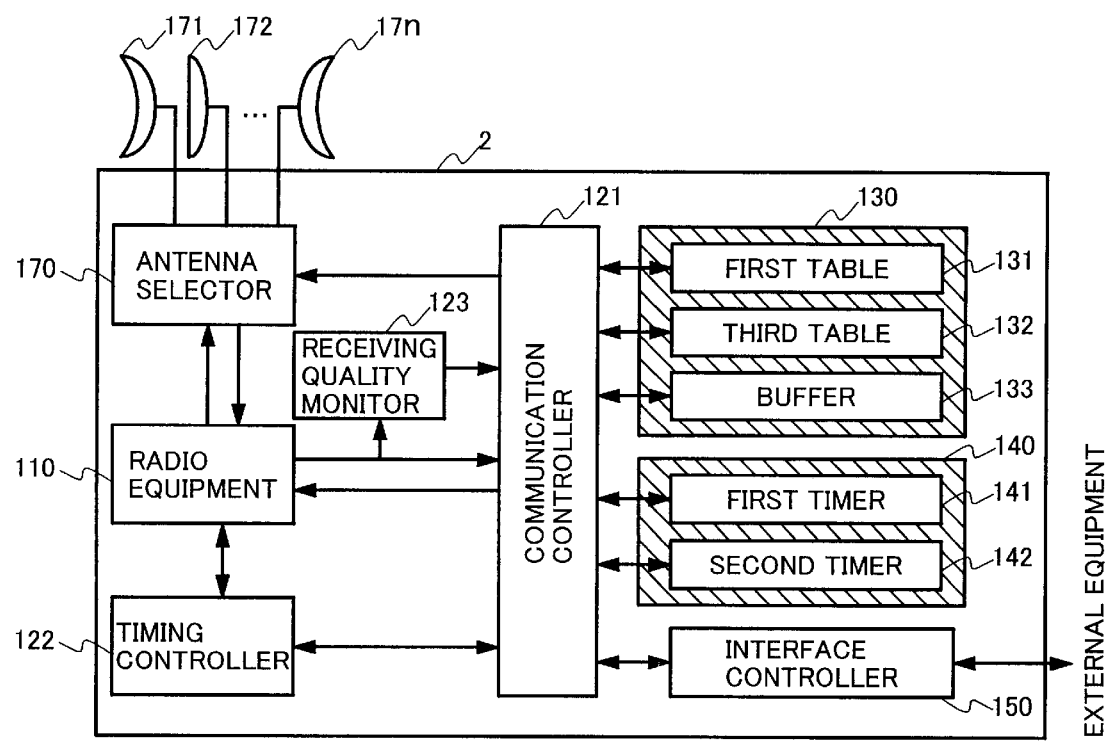
FIG. 4 is a block diagram showing a configuration of a subscriber station included in the fixed wireless access system according to a preferred embodiment of the present invention.

Referring to FIG. 4, there is shown a configuration block diagram of a subscriber station equipped with a repeating function in the fixed wireless access system according to a preferred embodiment of the present invention.

A subscriber station 2 comprises: a radio circuit 110 capable of transmitting and receiving signals at the same frequency; a communication controller 121 for identifying an incoming signal, for generating an outgoing signal, and for managing radio channels and an antenna to be used for transmission and reception; a timing controller 122 for extracting a clock signal from the incoming signal to provide system synchronization; a receiving quality monitor 123 for measuring reception quality of the incoming signal; an antenna selector 170 for selecting one or plural antennas according to a selection signal issued from the communication controller 121; a plurality of directional antennas 171, 172 to 17n having respective directivities to different orientations; a memory section 130; a timer section 140 including a first timer 141 for indicating the upper limit of a period of searching for a wireless station serving as a clock supplier and a second timer 142 for indicating the upper limit of a period of searching for a lower-level subscriber station to be connected with the subscriber station 2; and an interface controller 150 for controlling input from and output to external input/output equipment.

The memory section 130 includes a first table 131 for registering information on a wireless station serving as a clock supplier for the subscriber station 2 when each of the plural directional antennas 171, 172 to 17n is used and for registering information for identifying a relaying path to a lower-level subscriber station for signal repetition via the subscriber station 2, a third table 132 for recording a frame format for identifying each channel position, and a buffer memory 133 for temporarily storing signals to be communicated between another subscriber station and the base station.

Figure 5:
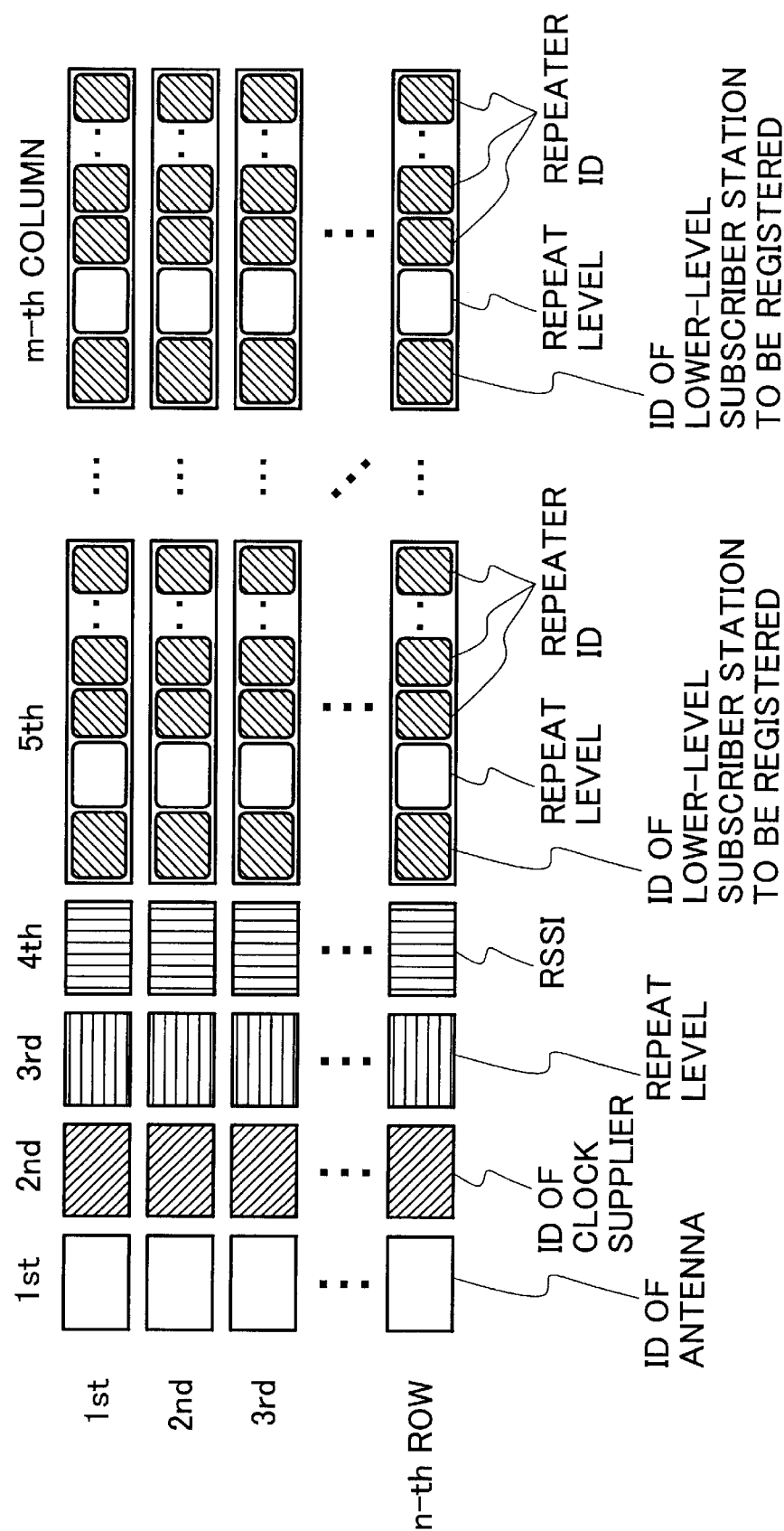
FIG. 5 is a diagram for explaining a structure of a first table in the preferred embodiment shown in FIG. 4.

The following describes the first table 131 in detail with reference to FIG. 5. The first table 131 is formed in a matrix structure of "n" rows by "m" columns, where "m" is an integer of 5 or higher. In the first column on each row of the first table 131, an ID of each of plural directional antennas equipped for the subscriber station 2 is stored so that duplicate ID assignment is not made.

On each row of the first table 131, the second column element indicates an ID of a clock supplier which is contained in a signal received on a control channel using a directional antenna having an ID thereof stored in the first column. The third column element indicates a repeat level. The fourth column element indicates an evaluation index representing the quality of signal reception. In each of the fifth and subsequent columns, the following elements are stored as a set: an ID of a subscriber station to be registered which is contained in a signal received on a reservation channel using a directional antenna having an ID thereof stored in the first column, a repeat level, and an ID of each subscriber station to be used as a repeater (routing information).

The term "repeat level" noted above represents a signal relaying count. Repeat level 0 is given to an original signal which has not yet been relayed, repeat level 1 is given to a signal which has been relayed once, and repeat level "n" is given to a signal which has been relayed "n" times. In the initial state, the columns on each row are left blank except the first column, and a pointer for the communication controller 121 is set at the first row of the first table 131.

The upper limit "t2__" of a period of searching for a lower-level subscriber station in the timer 142 is predefined by the following two factors: the maximum number "nmax" of directional antennas equipped on a subscriber station included in the fixed wireless access system, and the upper limit "t1__" of a period of searching for a clock supplier used for the timer 141. To be more specific, the following relationship is established:

$$t2\_ \geq nmax \times t1\_$$

The operations of the subscriber station 2 will then be described hereinafter according to the table of contents indicated below.
1. Initial Operation
1-1. Operation for System Synchronization
1-2. Operation for Registration in System
2. Operation for Signal Repetition
2-1. Relaying Path Setup Test
2-2. Repeater Station Operation
3. Various Operations in Subscriber Station
3-1. Termination to Subscriber Station
3-2. Origination from Subscriber Station
3-3. Re-registration in System
3-4. Change of Reference Wireless Station
1. Initial Operation
1-1. Operation for System Synchronization
(Procedure 1-1)

The communication controller 121 reads out an antenna ID stored in the first column on a pointer-specified row of the table 131. Through the antenna selector 170, the communication controller 121 selects a directional antenna corresponding to the antenna ID thus read out.

Then, the timer 141 is started, and the radio circuit 110 is put in a ready-to-receive state. When any signal is received by the radio circuit 110 through the directional antenna selected as mentioned above, the radio circuit 110 feeds the received signal to the timing controller 122 and the receiving quality monitor 123. In the timing controller 122, a clock signal is extracted from the received signal. In the receiving quality monitor 123, an evaluation index representing the quality of signal reception is calculated from the received signal, and the evaluation index thus calculated is furnished to the communication controller 121. As an evaluation index representing the quality of signal reception, it is allowed to use a received signal strength indicator (RSSI), a data error rate, or any other value which directly or indirectly indicates the quality of signal reception. In the present invention, no limitation is imposed on which evaluation index is to be used.

Still more specifically, when the communication controller 121 identifies the received signal as a control channel signal, the communication controller 121 extracts system clock information from a predetermined position in the received signal. The system clock information thus extracted is set in the timing controller 122. In this fashion, the subscriber station 2 is synchronized with the system. The communication controller 121 also extracts frame format information from a predetermined position in the control channel signal, and the frame format information thus extracted is stored into the table 132.

Further, the communication controller 121 extracts a clock supplier ID and a repeat level from predetermined positions in the control channel signal, and the clock supplier ID and repeat level thus extracted are stored into the second and third column on a pointer-specified row of the table 131, respectively. Besides, the communication controller 121 attains an evaluation index of signal reception quality from the receiving quality monitor 123, and the evaluation index thus attained is stored into the fourth column on the pointer-specified row. Even after system synchronization is set up, the subscriber station 2 continues signal reception using the selected antenna. In a situation where a control channel signal is received from another wireless station, the communication controller 121 extracts a clock supplier ID and a repeat level from predetermined positions in the received control channel signal, and attains from the receiving quality monitor 123 an evaluation index of signal reception quality for the received signal. Then, the clock supplier ID, repeat level, and evaluation index thus attained are compared with existent values stored on the pointer-specified row of the table 131. If the following condition (1) or (2) is satisfied, then the existent values are replaced with the above-mentioned clock supplier ID, repeat level, and evaluation index.

Condition (1): The extracted repeat level is lower than an existent level stored in the table 131.

Condition (2): The extracted repeat level is identical to an existent level stored in the table 131, and also the attained evaluation index of signal reception quality indicates a quality level higher than that stored in the table 131.

After a lapse of a predetermined period of time "t1_", the timer 141 notifies the communication controller 121 thereof. Then, regardless of whether any signal is received or not, the communication controller 121 stops the timer 141 when notified by the timer 141 that the predetermined period of time has elapsed.

(End of Procedure 1-1)

After the timer 141 is stopped, the pointer in the table 131 is advanced to the next row to perform "Procedure 1-1" again for another directional antenna. When the pointer indicates the "n"th row of the table 131, i.e., when control channel signal reception has been attempted for all the directional antennas, the table 131 is examined and, from directional antennas which have received a signal having the lowest repeat level, a directional antenna indicating the best quality of signal reception is selected. An antenna ID assigned to the selected directional antenna is stored into the table 132 as a reference antenna ID, a clock supplier ID indicated on a row containing the antenna ID of the selected directional antenna is stored thereinto as a reference wireless station ID, and a repeat level indicated on the row containing the antenna ID of the selected directional antenna is stored thereinto as a subscriber station level. Then, "Operation for Registration in System" described below in Item 1-2 is carried out continuously. If no control channel signal is received, i.e., if the subscriber station 2 is not synchronized with the system, the pointer for the communication controller 121 is set again at the first row of the table 131 and "Procedure 1-1" is performed again.

1-2. Operation for Registration in System (Procedure 1-2)

Making access to the table 132, the communication controller 121 acquires the reference antenna ID, reference wireless station ID and subscriber station level. Then, through the antenna selector 170, the communication controller 121 selects a directional antenna corresponding to the reference antenna ID thus acquired, and using a reservation channel conforming to the acquired subscriber station level, the communication controller 121 transmits a signal indicating registration in the system. The signal indicating registration in the system (referred to simply as a system registration signal) contains a predetermined class code indicating system registration, an own wireless station ID to be registered, a registry wireless station ID, and a repeat level. Note that the registry wireless station ID is used as a reference wireless station ID and the repeat level is "0" in this example. After transmission of the system registration signal, control channel monitoring is performed for a predetermined period of time.

(End of Procedure 1-2)

If a control channel signal received during the predetermined time period of control channel monitoring contains a response to the system registration signal (referred to simply as a system registration response), then the control channel monitoring is terminated. Otherwise, "Procedure 1-2" is performed again. The system registration response noted above is a signal which contains a predetermined response class code and an own wireless station ID which has been inserted in the system registration signal.

2. Operation for Signal Repetition

For execution of signal repetition, each subscriber station receives a control channel signal having a predetermined repeat level "nL" or lower using any one of the directional antennas 171 to 17n, and then the subscriber station is synchronized with the system. Thus, the subscriber station can be made available as a candidate for a repeater station (referred to as a candidate repeater subscriber station). The candidate repeater subscriber station temporarily stores the contents of the received control channel signal into the buffer memory 133. Thereafter, each time a new control channel signal is received, the candidate repeater subscriber station updates the contents temporarily stored in the buffer memory 133. The candidate repeater subscriber station periodically establishes a relaying path for checking whether signal repetition is needed or not. This procedure will be described in "2-1. Relaying Path Setup Test" given below. If it is judged that signal repetition is needed as a result of the relaying path setup test, the candidate repeater subscriber station becomes serviceable as a repeater station. This procedure will be described in "2-2. Repeater Station Operation" to be described later.

2-1. Relaying Path Setup Test 2-1-1. Repeater Setup Test

In the candidate repeater subscriber station, a signal indicating a request for relaying path setup test may be received through a control channel, the timing controller 122 may indicate a predetermined time for relaying path setup test, or a signal indicating a request for relaying path setup test may be received from any external input/output equipment through the interface controller 150. In any of these situations, the communication controller 121 transmits a signal indicating control channel reservation (referred to as a control channel reservation signal), using a reservation channel conforming to an own subscriber station level. This signal contains a command class code indicating reservation of a predetermined control channel and an own wireless station ID.

After transmitting the control channel reservation signal, the communication controller 121 checks the presence/absence of a response to the control channel reservation signal (referred to as a control channel reservation response) on a control channel for a predetermined period of time. The control channel reservation response contains a predetermined response class code, a wireless station ID given to a subscriber station serving as a control channel assignee, and a code for identifying an allocated control channel.

When the communication controller 121 detects on a control channel a control channel reservation response indicating an own wireless station ID for an assignee subscriber station, the fifth and subsequent columns on each row of the table 131 are made blank and the pointer is set at the first row of the table 131. Then, using a control channel specified by the code for identifying the allocated control channel, the communication controller 121 initiates a repeater setup test in "Procedure 2-1-1" described below.

(Procedure 2-1-1)

From a control channel signal stored temporarily in the buffer memory 133, the communication controller 121 extracts a repeat level. Then, the communication controller 121 increments a value of the extracted repeat level by one. A repeat level having the value thus incremented by one, an own wireless station ID, a system clock, and a code indicating enrollment invitation to another subscriber station are multiplexed at a predetermined position in the control channel signal stored temporarily in the buffer memory 133. Thus, a repetition control channel signal is generated.

Then, through the antenna selector 170, the communication controller 121 selects a directional antenna corresponding to an antenna ID which is stored in the first column on a pointer-specified row of the table 131. The communication controller 121 then starts the timer 142 and transmits the generated repetition control channel signal using the allocated control channel. Until the timer 142 indicates a lapse of a predetermined period of time, the communication controller 121 generates a repetition control channel signal repetitively as mentioned above, and using the allocated control channel, the communication controller 121 repeats transmission through the selected directional antenna. Furthermore, until the timer 142 indicates a lapse of the predetermined period of time, the communication controller 121, using the selected antenna, monitors the presence/absence of a system registration signal or a system registration repeat signal (a signal indicating repetition for registration in the system) on a reservation channel from another lower-level subscriber station. The system registration repeat signal contains a predetermined class code indicating repetition for system registration, a wireless station ID given to a subscriber station to be registered, a registry wireless station ID, a repeat level, and a wireless station ID given to a subscriber station to be used as a repeater. According to the repeat level indicated in the system registration repeat signal, a plurality of wireless station IDs given to subscriber stations to be used as repeaters may be contained in the system registration repetition signal. For example, where the repeat level is "2", two wireless station IDs given to two subscriber stations to be used as repeaters are contained in the system registration repeat signal. These wireless station IDs of subscriber stations to be used as repeaters are stored in a predetermined order so that a relaying path can be uniquely identified.

When a system registration signal or system registration repeat signal indicating an own registry wireless station ID is received from another subscriber station, the system registration signal or system registration repeat signal is temporarily stored into the buffer memory 133. Then, from the signal thus stored in the buffer memory 133, the communication controller 121 extracts a wireless station ID of a subscriber station to be registered. In a search of the fifth and subsequent columns on each row of the table 131, the communication controller 121 checks whether the same wireless station ID as the above extracted ID exists already or not. If the same wireless station ID is found, it is removed from the table 131 along with its corresponding repeat level and wireless station IDs of subscriber stations to be used as repeaters.

On completion of the above search, the extracted wireless station ID, its corresponding repeat level, and wireless station IDs of subscriber stations to be used as repeaters are registered into the fifth and subsequent columns on a pointer-specified row of the table 131 for the purpose of successive updating. Then, according to the repeat level, either of the following processing steps (i) and (ii) is carried out:

(i) If the repeat level is "0", the system registration response is transmitted to a subscriber station specified by the extracted wireless station ID, using the allocated control channel.

(ii) If the repeat level is not "0", a signal indicating a response to the system registration repeat signal is generated and transmitted using the allocated control channel. The signal indicating a response to the system registration repeat signal contains a predetermined response class code and a wireless station ID given to a prospective last repeater subscriber station which has transmitted the system registration repeat signal. Since the system registration repeat signal contains a wireless station ID given to a subscriber station to be used as a repeater so that a relaying path can be uniquely identified, it is easy to determine the wireless station ID given to the prospective last repeater subscriber station.

After the above-mentioned processing step (i) or (ii) is carried out, "2-1-2. Signal Repetition for Registration of Subscriber Station in System" to be described later is carried out independently of the above-mentioned "Procedure 2-1-1". When a predetermined period of time "t2__" has elapsed, the timer 142 notifies the communication controller 121 of the expiration of the predetermined period of time. Then, regardless of the presence/absence of a request for registration from another subscriber station, the communication controller 121 stops the timer 142 when notified by the timer 141 that the predetermined period of time has elapsed.

(End of Procedure 2-1-1)

After the timer 142 is stopped, the pointer in the table 131 is advanced to the next row to perform "Procedure 2-1-1" again for another directional antenna. When the pointer indicates the "n"th row of the table 131, i.e., when enrollment invitation to the remaining subscriber stations has been attempted for all the directional antennas, the fifth and subsequent columns on each row of the table 131 are examined. Then, either of the following steps (i) and (ii) is carried out according to the result of examination of the table 131:

(i) If no wireless station ID of a subscriber station to be registered is found in the fifth and subsequent columns on any row, i.e., if no response to enrollment invitation issued by the subscriber station concerned has been made from any other subscriber stations, it is judged that signal repetition via the subscriber station concerned is not needed. Then, from the table 132, a reference antenna ID and a subscriber station level are read out. Through the antenna selector 170, a directional antenna specified by the reference antenna ID thus read out is selected, and a signal indicating the end of use of the allocated control channel is transmitted using a reservation channel conforming to the subscriber station level thus read out. The signal indicating the end of use of the allocated control channel contains a class code indicating the end of use of the allocated control channel and a code for identifying the control channel to be released.

After transmission of the signal indicating the end of use of the allocated control channel, control channel signal monitoring is performed for a predetermined period of time. When a code of a response to the signal indicating the end of use of the allocated control channel is detected, the control channel signal monitoring is terminated. The code of a response to the signal indicating the end of use of the allocated control channel contains a class code indicating deallocation of the allocated control channel.

(ii) If a wireless station ID of a subscriber station to be registered is found in the fifth and subsequent columns on any row, each antenna ID on the row is stored as a repeating antenna into the table 132. Thereafter, repeater station operation is performed as well as normal subscriber operation using communication channels. For details, refer to "2-2. Repeater Station Operation" to be described later.

2-1-2. Signal Repetition for Registration of Subscriber Station in System

From the contents of a system registration signal or a system registration repeat signal stored temporarily in the buffer memory 133, the communication controller 121 extracts a wireless station ID of a subscriber station to be registered, a repeat level, and wireless station IDs of subscriber stations to be used as repeaters (if any). While the wireless station ID of the subscriber station to be registered is left intact, the repeat level is incremented by one, and an own wireless station ID is added to the wireless station IDs of subscriber stations to be used as repeaters in a predetermined order so that a relaying path can be uniquely identified. Further, a predetermined class code indicating repetition for system registration and a registry wireless station ID are added to at least these three kinds of elements. Thus, a system registration repeat signal is generated. Note that the registry wireless station ID corresponds to a reference wireless station ID entered in the table 132 in this example. Thereafter, the next "Procedure 2-1-2" is carried out.

(Procedure 2-1-2)

Making access to the table 132, the communication controller 121 acquires a reference antenna ID. Then, through the antenna selector 170, the communication controller 121 selects a directional antenna corresponding to the reference antenna ID thus acquired, and using a reservation channel conforming to an own subscriber station level, the communication controller 121 transmits a system registration repeat signal. After transmission of the system registration repeat signal, control channel monitoring is performed for a predetermined period of time.

(End of Procedure 2-1-2)

If a control channel signal received during the predetermined time period of control channel monitoring contains a response to the system registration repeat signal thus transmitted, then the signal repetition operation concerned is terminated. Otherwise, "Procedure 2-1-1" is performed again. The response to the system registration repeat signal contains a predetermined response class code and an own wireless station ID which has been inserted in the system registration repeat signal.

2-2. Repeater Station Operation

Repeater station operation can be carried out by a subscriber station to which a control channel has been allocated. In repeater station operation, a reference antenna is used for communication with a reference station and a repeating antenna is used for communication with a lower-level subscriber station in principle, unless otherwise specified as to antenna selection.

2-2-1. Control Channel Signal Transfer

In a subscriber station to which a control channel has been allocated, the communication controller 121 extracts a repeat level from a control channel signal temporarily stored in the buffer memory 133. Then, the communication controller 121 increments a value of the extracted repeat level by one. A repeat level having the value thus incremented by one, an own wireless station ID, and a system clock are multiplexed at a predetermined position in the control channel signal stored temporarily in the buffer memory 133. Thus, a repetition control channel signal is generated. Then, the communication controller 121 reads a repeating antenna ID out of the table 132. Through the antenna selector 170, the communication controller 121 selects any directional antenna corresponding to the relaying antenna ID. Using the own allocated control channel, the communication controller 121 transmits the repetition control channel signal.

2-2-2. Repetition for Registration of Another Subscriber Station in System

In a subscriber station to which a control channel has been allocated, the communication controller 121 reads a repeating antenna ID out of the table 132. Through the antenna selector 170, the communication controller 121 selects any directional antenna corresponding to the repeating antenna ID. Then, the communication controller 121 monitors the presence/absence of a system registration signal or a system registration repeat signal on a reservation channel.

When a system registration signal or a system registration repeat signal indicating an own registry wireless station ID is received from another subscriber station, the system registration signal or system registration repeat signal is temporarily stored into the buffer memory 133. Then, from the signal thus stored in the buffer memory 133, the communication controller 121 extracts a wireless station ID of a subscriber station to be registered. Making access to the table 132, the communication controller 121 acquires a repeating antenna ID. In a search of the table 131, the communication controller 121 checks the fifth and subsequent columns on each row indicating the acquired repeating antenna ID in the first column. If the same wireless station ID as the above extracted wireless station ID is found, the same wireless station ID is removed from the checked row of the table 131 along with its corresponding repeat level and wireless station IDs of subscriber stations to be used as repeaters. Thereafter, a wireless station ID of a subscriber station to be registered, its corresponding repeat level, and wireless station IDs of subscriber stations to be used as repeaters are added to the blank fifth and subsequent columns on each row indicating the acquired repeating antenna ID. Then, according to the repeat level, either of the following processing steps (i) and (ii) is carried out:

(i) If the repeat level is "0", a signal indicating a response to registration is transmitted to a subscriber station specified by the extracted wireless station ID, using the allocated control channel. The signal indicating a response to registration contains a predetermined class code indicating a destination-of-response wireless station ID.

(ii) If the repeat level is not "0", a response signal to the system registration repeat signal is generated and transmitted using the allocated control channel.

Further, from the contents of a system registration signal or a system registration repeat signal stored temporarily in the buffer memory 133, the communication controller 121 extracts a wireless station ID of a subscriber station to be registered, a repeat level, and wireless station IDs of subscriber stations to be used as repeaters (if any). While the wireless station ID of the subscriber station to be registered is left intact, the repeat level is incremented by one, and an own wireless station ID is added to the wireless station IDs of subscriber stations to be used as repeaters in a predetermined order so that a relaying path can be uniquely identified. Still further, a predetermined class code indicating repetition for system registration and a registry wireless station ID are added to at least these three kinds of elements. Thus, a system registration repeat signal is generated. Note that the registry wireless station ID corresponds to a reference wireless station ID entered in the table 132 in this example. Thereafter, the next "Procedure 2-2-2" is carried out.

(Procedure 2-2-2)

Making access to the table 132, the communication controller 121 acquires a reference antenna ID. Then, through the antenna selector 170, the communication controller 121 selects a directional antenna corresponding to the reference antenna ID thus acquired, and using a reservation channel conforming to an own subscriber station level, the communication controller 121 transmits a system registration repeat signal. After transmission of the system registration repeat signal, control channel monitoring is performed for a predetermined period of time.

(End of Procedure 2-2-2)

If a control channel signal received during the predetermined time period of control channel monitoring contains a response to the system registration repeat signal thus transmitted, then the signal repetition operation concerned is terminated. Otherwise, "Procedure 2-2-2" is performed again.

2-2-3. Repetition of Termination to Another Subscriber Station

In a subscriber station to which a control channel has been allocated, the communication controller 121 monitors the presence/absence of a signal indicating termination to a subscriber station through the control channel. The signal indicating termination to a subscriber station contains a predetermined class code indicating termination to a subscriber station, a wireless station ID of a terminating subscriber station, a code for identifying an uplink/downlink communication channel allocated to the terminating subscriber station, a wireless station ID of a subscriber station to be used as a repeater for the terminating subscriber station, and a code for identifying an uplink/downlink communication channel allocated for signal repetition by the repeater.

In the subscriber station termination indicating signal noted above, a plurality of wireless station IDs of subscriber stations to be used as repeaters and a plurality of codes for identifying uplink/downlink communication channels allocated for signal repetition by the repeaters may be contained according to the number of subscriber stations to be used as repeaters between the terminating subscriber station and base station. The plural wireless station IDs of subscriber stations to be used as repeaters and the plural codes for identifying uplink/downlink communication channels allocated for signal repetition by the repeaters are stored in a predetermined order so that a relaying path between the terminating subscriber station and base station can be identified.

The communication controller 121 examines the subscriber station termination indicating signal mentioned above. If the communication controller 121 finds that the wireless station ID of the terminating subscriber is contained in the fifth or subsequent column on any row of the table 131 and that any one of the plural wireless station IDs of subscriber stations to be used as repeaters corresponds to an own wireless station ID, the communication controller 121 identifies an uplink/downlink communication channel for signal reception by the own subscriber station and an uplink/downlink communication channel allocated to the own subscriber station for signal repetition according to a relaying path selected using the subscriber station termination indicating signal. Then, a signal received using the identified downlink communication channel for signal reception by the own subscriber station is temporarily stored into the buffer memory 133, and then the temporarily stored signal is transmitted using the identified downlink communication channel allocated to the own subscriber station for signal repetition. Likewise, a signal received using the identified uplink communication channel for signal reception by the own subscriber station is temporarily stored into the buffer memory 133, and then the temporarily stored signal is transmitted using the identified uplink communication channel allocated to the own subscriber station for signal repetition.

2-2-4. Repetition of Origination from Another Subscriber Station

In a subscriber station to which a control channel has been allocated, when a signal indicating reservation of a communication channel (referred to as a communication channel reservation signal) is received from a lower-level subscriber station through a reservation channel, the communication controller 121 temporarily stores the communication channel reservation signal into the buffer memory 133. The communication channel reservation signal contains a predetermined class code indicating communication channel reservation and a wireless station ID of a source-of-reservation subscriber station. Using a reservation channel conforming to an own subscriber station level, the communication controller 121 transfers the temporarily stored communication channel reservation signal to a reference wireless station serving for the own subscriber station. Thereafter, the same procedure as that described for "Repetition of Termination to Another Subscriber Station" in Item 2-2-3. is carried out.

2-2-5. Repetition of Control Channel Reservation

In a subscriber station to which a control channel has been allocated, the communication controller 121 monitors the presence/absence of a control channel reservation signal on a reservation channel. When the control channel reservation signal is received from another subscriber station, the communication controller 121 temporarily stores the received control channel reservation signal into the buffer memory 133. Then, making access to the table 131, the communication controller 121 checks whether or not a wireless station ID of a source-of-reservation subscriber station contained in the received control channel reservation signal is registered in the fifth or subsequent column on any row of the table 131. If the wireless station ID of the source-of-reservation subscriber station is found, the communication controller 121 makes access to the table 132 and reads out a reference antenna ID and a subscriber station level. Through the antenna selector 170, the communication controller 121 selects a directional antenna corresponding to the reference antenna ID thus read out. Then, using a reservation channel conforming to the subscriber station level thus read out, the communication controller 121 transfers the temporarily stored control channel reservation signal to the reference wireless station serving for the own subscriber station.

2-2-6. Repetition of End Indication of Control Channel Use

In a subscriber station to which a control channel has been allocated, the communication controller 121 monitors the presence/absence of a signal indicating the end of control channel use on a reservation channel from another subscriber station. The signal indicating the end of control channel use contains a predetermined class code representing the end of control channel use and a code for identifying a control channel to be released. Upon receipt of the signal indicating the end of control channel use, the communication controller 121 temporarily stores the received signal into the buffer memory 133.

Then, making access to the table 132, the communication controller 121 reads out a reference antenna ID and a subscriber station level. Though the antenna selector 170, the communication controller 121 selects a directional antenna corresponding to the reference antenna ID thus read out. Then, using a reservation channel conforming to the subscriber station level thus read out, the communication controller 121 transfers the temporarily stored signal indicating the end of control channel use to a reference wireless station serving for the own subscriber station.

3. Various Operations in Subscriber Station

In various operations described below, a reference antenna is used for communication with a reference station in principle, unless otherwise specified as to antenna selection.

3-1. Termination to Subscriber Station

In the subscriber station 2, the communication controller 121 monitors the presence/absence of a signal indicating termination to a subscriber station through a control channel. The signal indicating termination to a subscriber station contains a predetermined class code representing termination to a subscriber station, a wireless station ID of a terminating subscriber station, and a code for identifying an uplink/downlink communication channel allocated to the termination subscriber station. If the communication controller 121 recognizes that the wireless station ID of the terminating subscriber station contained in the above signal matches a wireless station ID of the own subscriber station, the communication controller 121 starts communication using a communication channel specified by the code for identifying an uplink/downlink communication channel contained in the above signal.

3-2. Origination from Subscriber Station

In the subscriber station 2, the communication controller 121 transmits a signal indicating reservation of a communication channel using a reservation channel conforming to an own subscriber station level (referred to as a communication channel reservation signal). The communication channel reservation signal contains a predetermined class code indicating communication channel reservation and a wireless station ID of the own subscriber station used as a source of reservation. After transmission of the communication channel reservation signal, the communication controller 121 monitors the presence/absence of a signal indicating termination to a subscriber station on a control channel for a predetermined period of time. The signal indicating termination to a subscriber station contains a predetermined class code representing termination to a subscriber station, a wireless station ID of a terminating subscriber station, and a code for identifying an uplink/downlink communication channel allocated to the terminating subscriber station.

On the control channel, the communication controller 121 identifies the signal indicating termination to a subscriber station and recognizes that the wireless station ID of the terminating subscriber station contained in the above signal matches a wireless station ID of the own subscriber station. Then, the communication controller 121 starts communication using a communication channel specified by the code for identifying an uplink/downlink communication channel contained in the above signal.

3-3. Re-registration in System

In the subscriber station 2, when a signal indicating enrollment invitation is received from its associated reference wireless station through a control channel, the communication controller 121 makes access to the timer 142 to check an operating condition thereof. If the timer 142 is inactive, the communication controller 121 starts the timer 142 and then carries out the next "Procedure 3-3". If the timer 142 is active, the communication controller 121 judges that a signal indicating enrollment invitation has already been received. In this case, the communication controller 121 does not proceeds to "Procedure 3-3". The signal indicating enrollment invitation contains a predetermined class code representing enrollment invitation.

After a lapse of a predetermined period of time "t2_", the timer 142 notifies the communication controller 121 of the expiration of the predetermined period of time "t2_". The communication controller 121 stops the timer 142 when notified that the predetermine period of time "t2_" has elapsed.

(Procedure 3-3)

Making access to the table 132, the communication controller 121 acquires a reference antenna ID, a reference wireless station ID, and a subscriber station level. Through the antenna selector 170, the communication controller 121 selects a directional antenna corresponding to the reference antenna ID thus acquired. Then, using a reservation channel conforming to an own subscriber station level, the communication controller 121 transmits a system registration signal. Further, if the own subscriber station is used as a repeater, i.e., if wireless station IDs of lower-level subscriber stations are registered in the fifth and subsequent columns on any row of the table 131, the system registration repeat signal is transmitted to all the registered lower-level subscriber stations.

The system registration signal contains a predetermined class code indicating system registration, an own wireless station ID to be registered, a registry wireless station ID, and a repeat level. Note that the registry wireless station ID is used as a reference wireless station ID and the repeat level is "0" in this example. The system registration repeat signal contains a predetermined class code indicating repetition for system registration, a registry wireless station ID, a wireless station ID of a subscriber station to be registered, a repeat level thereof, and wireless station IDs of subscriber stations to be used as repeaters. The registry wireless station ID is assigned as a reference wireless station ID. The wireless station ID of a subscriber station to be registered, the repeat level thereof, and the wireless station IDs of subscriber stations to be used as repeaters correspond respectively to a wireless station ID of a subscriber station stored in the fifth or subsequent column of the table 131, an incremented-by-one value of a repeat level stored therein, and wireless station IDs of subscriber stations to be used as repeaters stored therein, which additionally include an own wireless station ID. In additional inclusion of the own wireless station ID to the wireless station IDs of subscriber stations to be used as repeaters, these wireless station IDs are arranged in a predetermined order so that a relaying path between the subscriber station to be registered and the own wireless station can be uniquely identified. Where a plurality of system registration signals or system registration repeat signals for a plurality of subscriber stations are transmitted, these signals may be multiplexed onto one signal in a predetermined order. After transmission of the system registration signal or the system registration repeat signal, control channel monitoring is performed for a predetermined period of time.

(End of Procedure 3-3)

If a control channel signal received during the predetermined time period of control channel monitoring contains a response to the system registration signal or to the system registration repeat signal, then the control channel monitoring is terminated. Otherwise, "Procedure 3-3" is performed again. The response to the system registration signal contains a predetermined response class code and an own wireless station ID which has been inserted in the system registration signal. The response to the system registration repeat signal contains a predetermined response class code and an own wireless station ID which has been inserted in the system registration repeat signal.

3-4. Change of Reference Wireless Station

In an indirect access subscriber station which has been registered in the system, the communication controller 121 sets the pointer at the first row of the table 131, and the next "Procedure 3-4" is carried out.

(Procedure 3-4-1)

For a control channel used for transmission by a wireless station different from a reference wireless station, the communication controller 121 reads out an antenna ID stored in the first column on a pointer-specified row of the table 131. Through the antenna selector 170, the communication controller 121 selects a directional antenna corresponding to the antenna ID thus read out. Then, the timer 141 is started, and the radio circuit 110 is put in a ready-to-receive state. When a control channel signal is received through the above-mentioned control channel, the communication controller 121 extracts a transmitting-source wireless station ID and a repeat level from predetermined positions of the received signal and attains an evaluation index of signal reception quality for the received signal from the receiving quality monitor 123. The transmitting-source wireless station ID and repeat level thus extracted and the evaluation index of signal reception quality thus attained are compared with values which have already been stored on a pointer-specified row of the table 131. If the following condition (1) or (2) is satisfied, then the already stored values in the table 131 are replaced with the above-mentioned transmitting-source wireless station ID, repeat level and evaluation index of signal reception quality.

Condition (1): The extracted repeat level is lower than the already stored value in the table 131.

Condition (2): The extracted repeat level is identical to the already stored value in the table 131, and also the attained evaluation index of signal reception quality indicates a quality level higher than that already stored in the table 131.

On occurrence of the above replacement, the following conditions (3), (4) and (5) are checked. If any one of these conditions is satisfied, the antenna ID stored in the first column on the pointer-specified row of the table 131, the transmitting-source wireless station ID corresponding thereto, and the repeat level corresponding thereto are stored into the table 132 as a reference antenna ID, reference wireless station ID, and subscriber station level, respectively. Then, the timer 141 is stopped and "Procedure 3-4-1" is terminated. Thereafter, for changing the reference wireless station, the next "Procedure 3-4-2" is carried out.

Condition (3): The antenna ID stored in the first column on the pointer-specified row of the table 131 is identical to the reference antenna ID.

Condition (4): The repeat level stored in the third column on the pointer-specified row of the table 131 is lower than that stored in the third column on the row corresponding to the reference antenna ID in the first column of the table 131.

Condition (5): The repeat level stored in the third column on the pointer-specified row of the table 131 is identical to that stored in the third column of the row corresponding to the reference antenna ID in the first column of the table 131, and also the evaluation index of signal reception quality stored in the fourth column on the pointer-specified row of the table 131 indicates a quality level higher than that stored in the fourth column on the row corresponding to the reference antenna ID in the first column of the table 131.

If any of the above conditions is not satisfied, the first timer 141 checks whether a predetermined period of time "t1__" has elapsed or not. After a lapse of the predetermined period of time "t1__", the timer 141 notifies the communication controller 121 thereof. Then, regardless of the presence/absence of a request for replacement, the communication controller 121 stops the timer 141.

(End of Procedure 3-4-1)

After the timer 141 is stopped, the pointer in the table 131 is advanced to the next row to perform "Procedure 3-4-1" again for another directional antenna. When the pointer indicates the "n"th row of the table 131, the pointer is set at the first row again and "Procedure 3-4-1" is performed again.

(Procedure 3-4-2)

Making access to the table 132, the communication controller 121 acquires a reference antenna ID, a reference wireless station ID and a subscriber station level. Through the antenna selector 170, the communication controller 121 selects a directional antenna corresponding to the reference antenna ID thus acquired. Then, using a reservation channel conforming an own subscriber station level, the communication controller 121 transmits a system registration signal. Further, if the own subscriber station is used as a repeater, i.e., if wireless station IDs of lower-level subscriber stations are registered in the fifth and subsequent columns on any row of the table 131, the system registration repeat signal is transmitted to all the registered lower-level subscriber stations.

The system registration signal contains a predetermined class code indicating system registration, an own wireless station ID to be registered, a registry wireless station ID, and a repeat level. Note that the registry wireless station ID is used as a reference station ID, and the repeat level is "0" in this example. The system registration repeat signal contains a predetermined class code indicating repetition for system registration, a registry wireless station ID, a wireless station ID of a subscriber station to be registered, a repeat level thereof, and wireless station IDs of subscriber stations to be used as repeaters. The registry wireless station ID is assigned as a reference wireless station ID. The wireless station ID of a subscriber station to be registered, the repeat level thereof, and the wireless station IDs of subscriber stations to be used as repeaters correspond respectively to a wireless station ID of a subscriber station stored in the fifth or subsequent column of the table 131, an incremented-by-one value of a repeat level added therein, and wireless station IDs of subscriber stations to be used as repeaters stored therein, which additionally include an own wireless station ID.

In additional inclusion of the own wireless station ID to the wireless station IDs of subscriber stations to be used as repeaters, these wireless station IDs are arranged in a predetermined order so that a relaying path between the subscriber station to be registered and the own wireless station can be uniquely identified. Where a plurality of system registration signals or system registration repeat signals for a plurality of subscriber stations are transmitted, these signals may be multiplexed onto one signal in a predetermined order. After transmission of the system registration signal or the system registration repeat signal, control channel monitoring is performed for a predetermined period of time.

(End of Procedure 3-4-2)

If a control channel signal received during the predetermined time period of control channel monitoring contains a response to the system registration signal or to the system registration repeat signal, then the control channel monitoring is terminated. Otherwise, "Procedure 3-4-2" is performed again. The response to the system registration signal contains a predetermined response class code and an own wireless station ID which has been inserted in the system registration signal. The response to the system registration repeat signal contains a predetermined response class code and an own wireless station ID which has been inserted in the system registration repeat signal.

Figure 6:
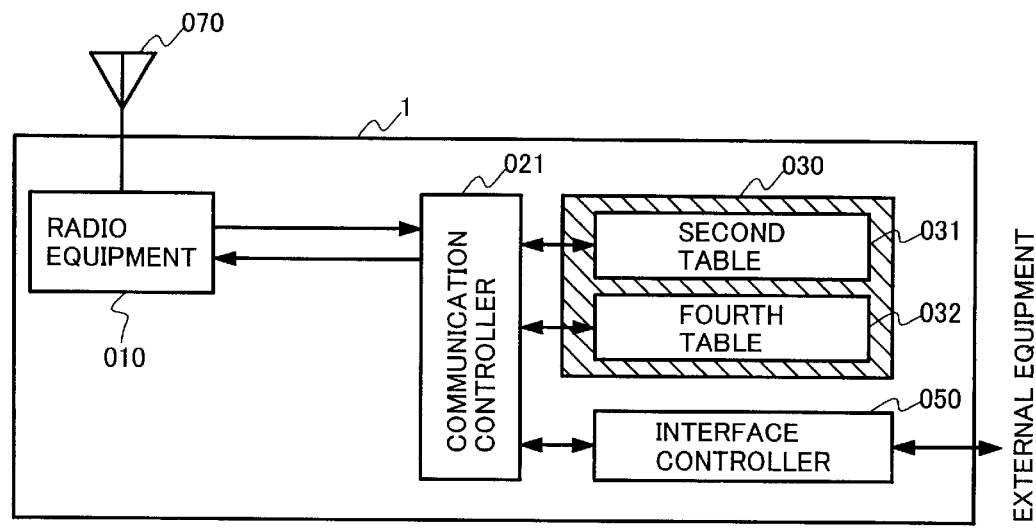
FIG. 6 is a diagram showing a configuration of a base station included in the fixed wireless access system according to a preferred embodiment of the present invention.

Referring to FIG. 6, there is shown a configuration of a base station in the fixed wireless access system according to a preferred embodiment of the present invention. In FIG. 6, reference numeral 1 indicates a base station, reference numeral 010 indicates a radio circuit capable of transmitting and receiving signals at the same frequency, reference numeral 021 indicates a communication controller which identifies an incoming signal, generates an outgoing signal and manages radio channels, reference numeral 030 indicates a memory section, reference numeral 031 indicates a second table for recording information regarding each subscriber station, reference numeral 032 indicates a fourth table for recording a frame format for identifying each channel position and for recording a use status of each channel, reference numeral 050 indicates an interface controller for controlling input from and output to external input/output equipment, and reference numeral 070 indicates an antenna.

Figure 7:
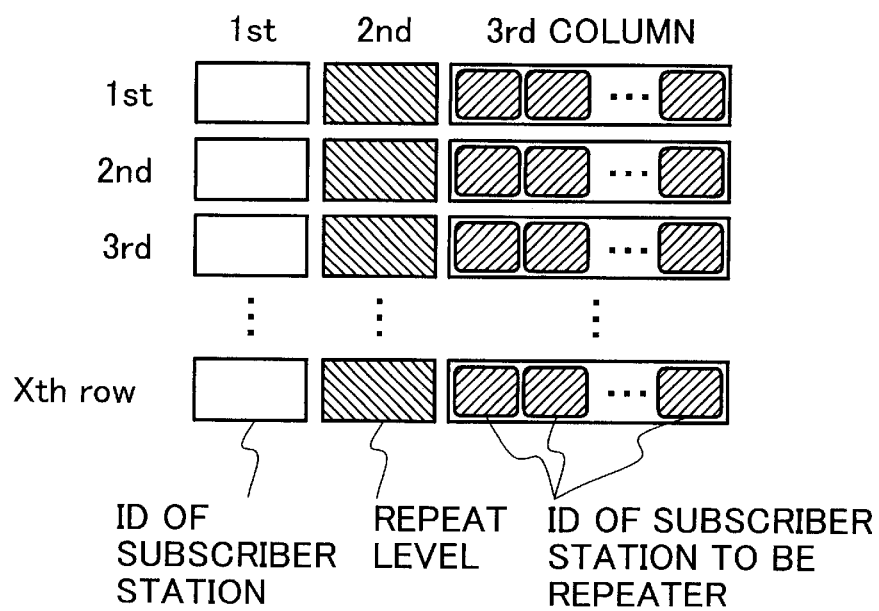
FIG. 7 is a diagram for explaining a structure of a second table in the preferred embodiment shown in FIG. 6.

The following describes the second table 031 in details with reference to FIG. 7. The second table 031 is formed in a matrix structure of "X" (integer) rows by 3 columns. Note that "X" is an integer representing the maximum number of subscriber stations which can be registered in the base station 1. In the first column on each row of the table 031, a wireless station ID of each of plural registered subscriber stations is stored so that duplicate ID assignment is not made. On each row of the table 031, the second column element indicates a repeat level of a subscriber station corresponding to the wireless station ID contained in the first column. The third column element on each row of the table 031 indicates wireless station IDs of subscriber stations to be used as repeaters for a subscriber station corresponding to the wireless station ID contained in the first column. The repeat level represents the number of subscriber stations to be used as repeaters in signal communication between the base station 1 and a subscriber station having the wireless station ID contained in the first column of the table 031. For example, repeat level 0 is assigned to a direct access subscriber station, and repeat level 1 is assigned to an indirect subscriber station which uses one repeater for communication with the base station 1. Further, in the third column of the table 031, the wireless station IDs of subscriber stations to be used as repeaters are arranged in a predetermined order so that a relaying path can be uniquely identified in communication between the base station 1 and the subscriber station having the wireless station ID contained in the first column. In the initial state, the columns on each row are left blank except the first column, and a pointer for the communication controller 021 is set at the first row of the table 031.

The operations of the base station 1 will then be described hereinafter according to the table of contents indicated below.

4. Acceptance of Subscriber Station Registration
5. Allocation and Deallocation of Control Channel
6. Origination from and Termination to Subscriber Station 4. Acceptance of Subscriber Station Registration In the base station 1, the communication controller 021 monitors the presence/absence of a system registration signal or a system registration repeat signal on a reservation channel. When a system registration signal or a system registration repeat signal corresponding to an own registry wireless station ID (i.e., an ID given to the base station 1) is received from a subscriber station, the communication controller 021 extracts a wireless station ID of a subscriber station to be registered from the received signal. Then, making access to the table 031, the communication controller 021 checks the first column on each row thereof. If the wireless station ID of the subscriber station to be registered is found in the first column on any row, the columns thereon are made blank once.

Then, regardless of the presence/absence of the wireless station ID of the subscriber station to be registered, the communication controller 021 selects a row having the blank first column in the table 031, and stores the wireless station ID of the subscriber station to be registered into the first column on the selected row. The communication controller 021 then extracts a repeat level from the received signal and stores the extracted repeat level into the second column on the selected row. If the extracted repeat level is not "0", all the wireless station IDs of subscriber stations to be used as repeaters are extracted from the received signal and stored into the third column on the selected row. Then, according to the extracted repeat level, either of the following processing steps (i) and (ii) is carried out:

(i) If the repeat level "0", a response to registration is transmitted from the communication controller 021 to a subscriber station having the extracted wireless station ID using a control channel. The response to registration is a signal containing a predetermined class code indicating a response to registration and a destination-of-response wireless station ID.

(ii) If the repeat level is not "0", the communication controller 021 generates a response signal to the system registration repeat signal and transmits the generated response signal using a control channel.

5. Allocation and Deallocation of Control Channel

5-1. Allocation of Control Channel

In the base station 1, the communication controller 021 monitors the presence/absence of a control channel reservation signal on the reservation channel. When the signal indicating control channel reservation is received from a subscriber station, the communication controller 021 accesses the table 032 to check whether any idle control channel is available or not. If an idle control channel is found in the table 032, the communication controller 021 selects the idle control channel from the table 032 and enters an indication of the use thereof in the table 032. Then, the communication controller 021 generates a response to the control channel reservation signal and transmits the generated response using the control channel.

5-2. Deallocation of Control Channel

In the base station 1, the communication controller 021 checks the reservation channel for monitoring the presence/absence of a signal indicating the end of control channel use. When the signal indicating the end of control channel use is received, the communication controller 021 accesses the table 032 and sets up an "idle" status for a control channel identified by a code contained in the received signal. Then, the communication controller 021 generates a response to the signal indicating the end of control channel use and transmits the generated response using the control channel.

6. Origination from and Termination to Subscriber Station

6-1. Termination to Subscriber Station

In the base station 1, the communication controller 021 monitors the presence/absence of a terminating signal to a subscriber station using the interface controller 050. The terminating signal to a subscriber station contains a wireless station ID for identifying a subscriber station and a predetermined class code indicating termination to a subscriber station. When the terminating signal to a subscriber station is recognized, a wireless station ID for identifying a subscriber station is extracted from the terminating signal. Then, making access to the table 031 containing information on subscriber station registration, the communication controller 021 examines the first columns on respective rows in succession to check whether the wireless station ID concerned is contained.

If the wireless station ID concerned is found in the first column on any row, the communication controller 021 extracts a repeat level from the second column on the row. Then, according to the extracted repeat level, either of the following processing steps (i) and (ii) is carried out:

(i) If the repeat level is "0", the communication controller 021 accesses the table 032 and checks whether at least a pair of uplink and downlink communication channels is idle or not. If an idle pair of uplink and downlink communication channels is found in the table 032, the communication controller 021 selects the idle pair of uplink and downlink communication channels from the table 032 and enters an indication of the use thereof in the table 032. Then, using a control channel, the communication controller 021 transmits a signal indicating termination to a subscriber station. The signal indicating termination to a subscriber station contains at least a predetermined class code representing termination to a subscriber station, a wireless station ID of a terminating subscriber station, and a code for identifying a pair of uplink and downlink communication channels allocated to the terminating subscriber station.

Then, the communication controller 021 monitors the uplink communication channel of the allocated pair of communication channels. If a response is received from the terminating subscriber station through the uplink communication channel, the communication controller 021 continuously conducts communication between the external input/output equipment and the terminating subscriber station using the allocated pair of uplink and downlink communication channels.

(ii) If the repeat level is "n" (where "n" is an integer of 1 or higher), the communication controller 021 accesses the table 032 and checks whether at least {n+1} pairs of uplink and downlink communication channels are idle or not. If {n+1} idle pairs of uplink and downlink communication channels are found in the table 032, the communication controller 021 selects these pairs from the table 032 and enters their use in the table 032. Then, making access to the table 031 containing information on subscriber station registration, the communication controller 021 extracts wireless station IDs of subscriber stations to be used as repeaters from the third column on a row corresponding to a wireless station ID of the terminating subscriber station. According to the extracted wireless station IDs of subscriber stations to be used as repeaters and a code for identifying the {n+1} selected pairs of uplink and downlink communication channels, the communication controller 021 generates a signal indicating termination to a subscriber station and transmits the generated signal using a control channel. The signal indicating termination to a subscriber station contains a predetermined class code representing termination to a subscriber station, a wireless station ID of a terminating subscriber station, a code for identifying uplink and downlink communication channels allocated to the terminating subscriber station, a wireless station ID of a subscriber station to be used as a repeater for the terminating subscriber station, and a code for identifying uplink and downlink communication channels allocated for repetition by the subscriber station to be used as a repeater.

According to the number of subscriber stations to be used as repeaters in communication between the terminating subscriber station and the base station 1, there may be contained a plurality of wireless station IDs of subscriber stations to be used as repeaters and a plurality of codes for identifying uplink and downlink communication channels allocated for repetition by the subscriber stations to be used as repeaters. The wireless station IDs of subscriber stations to be used as repeaters and the codes for identifying uplink and downlink communication channels allocated for repetition of the subscriber stations to be used as repeaters are stored in a predetermined order so that a relaying path between the base station 1 and the terminating subscriber station can be identified.

The communication controller 021 monitors the uplink communication channel of the communication channels allocated to the repeaters so that signal routing can be made to the base station 1 in any case. If a response is received from the repeater through the allocated uplink communication channel, the communication controller 021 continuously conducts communication between the external input/output equipment and the terminating subscriber station using the allocated uplink and downlink communication channels.

6-2. Origination from Subscriber Station

In the base station 1, the communication controller 021 monitors the presence/absence of a signal indicating communication channel reservation on a reservation channel. The signal indicating communication channel reservation contains a predetermined class code representing communication channel reservation and a wireless station ID of a source-of-reservation subscriber station. When the signal indicating communication channel reservation is received from a subscriber station, a wireless station ID of a source-of-reservation subscriber station is extracted. Then, making access to the table 031, the communication controller 021 extracts a repeat level from the second column on a row having the first column which contains a wireless station ID concerned. Then, according to the extracted repeat level, either of the following processing steps (i) and (ii) is carried out:

(i) If the repeat level is "0", the communication controller 021 accesses the table 032 and checks whether at least a pair of uplink and downlink communication channels is idle or not. If an idle pair of uplink and downlink communication channels is found in the table 032, the communication controller 021 selects the idle pair of uplink and downlink communication channels from the table 032 and enters an indication of the use thereof in the table 032. Then, using a control channel, the communication controller 021 transmits a signal indicating termination to a source-of-reservation subscriber station. The signal indicating termination to a source-of-reservation subscriber station contains a predetermined class code representing termination to a subscriber station, a wireless station ID of a terminating subscriber station, and a code for identifying a pair of uplink and downlink communication channels allocated to the terminating subscriber station. Then, the base station 1 monitors the uplink communication channel of the allocated pair of communication channels. If a response is received from the terminating subscriber station through the uplink communication channel, the communication controller 021 continuously conducts communication between the external input/output equipment and the terminating subscriber station using the allocated pair of uplink and downlink communication channels.

(ii) If the repeat level is "n" (where "n" is an integer of 1 or higher), the communication controller 021 accesses the table 032 and checks whether at least {n+1} pairs of uplink and downlink communication channels are idle or not. If {n+1} idle pairs of uplink and downlink communication channels are found in the table 032, the communication controller 021 selects these pairs from the table 032 and enters their use in the table 032. Then, making access to the table 031 containing information on subscriber station registration, the communication controller 021 extracts wireless station IDs of subscriber stations to be used as repeaters from the third column on a row corresponding to a wireless station ID of the terminating subscriber station. According to the extracted wireless station IDs of subscriber stations to be used as repeaters and a code for identifying the {n+1} selected pairs of uplink and downlink communication channels, the communication controller 021 generates a signal indicating termination to a subscriber station and transmits the generated signal using a control channel. The signal indicating termination to a subscriber station contains a predetermined class code representing termination to a subscriber station, a wireless station ID of a terminating subscriber station, a code for identifying uplink and downlink communication channels allocated to the terminating subscriber station, a wireless station ID of a subscriber station to be used as a repeater for the terminating subscriber station, and a code for identifying uplink and downlink communication channels allocated for repetition by the subscriber station to be used as a repeater.

According to the number of subscriber stations to be used as repeaters in communication between the terminating subscriber station and the base station 1, there may be contained a plurality of wireless station IDs of subscriber stations to be used as repeaters and a plurality of codes for identifying uplink and downlink communication channels allocated for repetition by the subscriber stations to be used as repeaters. The wireless station IDs of subscriber stations to be used as repeaters and the codes for identifying uplink and downlink communication channels allocated for repetition of the subscriber stations to be used as repeaters are stored in a predetermined order so that a relaying path between the base station 1 and the terminating subscriber station can be identified.

The communication controller 021 monitors the uplink communication channel of the communication channels allocated to the repeaters so that signal routing can be made to the base station 1 in any case. If a response is received from the repeater through the allocated uplink communication channel, the communication controller 021 continuously conducts communication between the external input/output equipment and the terminating subscriber station using the allocated uplink and downlink communication channels.

Figure 8:
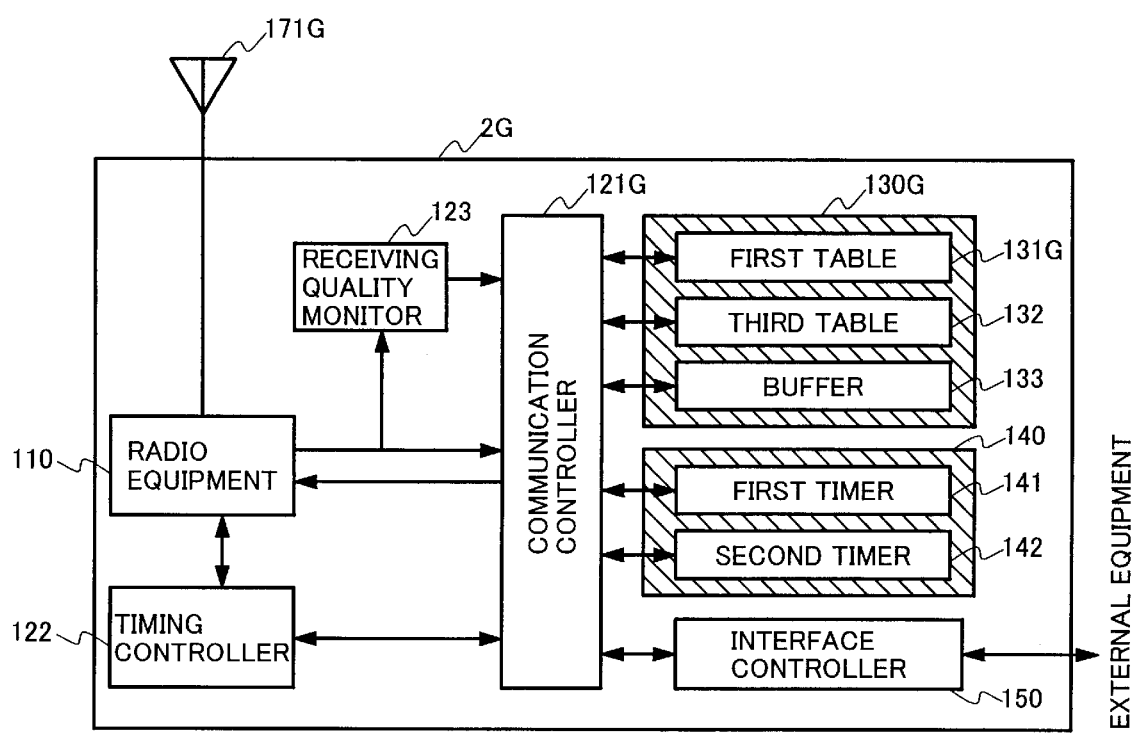
FIG. 8 is a block diagram showing another preferred embodiment of a subscriber station included in the fixed wireless access system according to the present invention.

Referring to FIG. 8, there is shown another preferred embodiment of a subscriber station included in the fixed wireless access system according to the present invention. It is preferable to employ the present embodiment in a case where a subscriber station needs just one antenna because of less stringent requirements imposed on antenna directivity characteristics. In comparison with the subscriber station 2 shown in FIG. 4, a subscriber station 2G comprises the following different parts: an antenna 171G, a communication controller 121G, and a first table 131G. Unlike the communication controller 121 shown in FIG. 4, the communication controller 121G does not need an antenna management function for signal transmission and reception. Further, unlike the table 131 shown in FIG. 5, the table 131G is required to have just one row (n=1). Still further, since the subscriber station 2G is provided with just one antenna 171G, the first column for storing an antenna ID thereof may be omitted in the table 131G. Furthermore, in a situation where the maximum number "nmax" of directional antennas possessed by a subscriber station included in the fixed wireless access system is "1", there may be provided such an arrangement that the second timer 142 is omitted and the first timer 141 is used as a substitute therefor.

The following describes a preferred embodiment of a subscriber charging method in the fixed wireless access system according to the present invention.

The base station 1 included in the fixed wireless access system comprises the table 031 containing information on the subscriber station 2. As explained in the foregoing, the table 031 is formed in a matrix structure of "X", rows by 3 columns, where "X" is an integer representing the maximum number of subscriber stations which can be registered in the base station 1. In the first column on each row of the table 031, a wireless station ID of each of plural subscriber stations in the fixed wireless access system is contained. In the second column on each row of the table 031, there is contained a repeat level of a subscriber station corresponding to the wireless station ID contained in the first column. In the third column on each row of the table 031, there are contained wireless station IDs of subscriber stations to be used as repeaters for communication between the base station 1 and a subscriber station corresponding to the wireless station ID contained in the first column. These wireless station IDs of subscriber stations to be used as repeaters are registered in a predetermined order so that a relaying path can be uniquely identified. For example, in a case where a subscriber station serving as a repeater for a first subscriber station is also used as a repeater for a second subscriber station, a wireless station ID of the subscriber station serving as a repeater is registered in the third column on a row containing a wireless station ID of the first subscriber station and also in the third column on a row containing a wireless station ID of the second subscriber station.

That is to say, a subscriber station serving as a repeater is used by more subscriber stations as the number of entries of a wireless station ID of the subscriber station serving as a repeater increases in the third column of the table 031. Therefore, a telecommunications carrier operating the fixed wireless access system of the present invention makes access to the table 031 in each base station 1 through the interface controller 050 and communication controller 021 using external input/output equipment. Then, the telecommunications carrier reads data out of the third column of the table 031, and counts the number of entries of a wireless station ID of each subscriber station serving as a repeater in the read-out data. According to the number of entries thus counted, distinctive charging can be made to each subscriber. More specifically, the telecommunications carrier may provide preferential charging to a particular subscriber station serving as a key point in signal repetition.

Various other modification will be apparent to and can be readily made by those skilled in the art without departing from the scope and spirit of this invention. Accordingly, it is not intended that the scope of the claims appended hereto be limited to the description as set forth herein, but rather that the claims be broadly constructed.

What is claimed is:

1. In a fixed wireless system based on a time-division multiple-access scheme in which a plurality of subscriber stations carry out communication via a base station using a signal frame having a control channel, a communication channel and a reservation channel, each of said subscriber stations comprising:
    a radio circuit capable of transmitting and receiving signals at the same frequency through an antenna;
    a communication controller, connected with said radio circuit, for identifying an incoming signal, for generating an outgoing signal, and for managing radio channels;
    a buffer memory for temporarily storing signals to be communicated between a different subscriber station and said base station;
    a first table for registering information on a wireless station which serves as a clock supplier for said subscriber station and for registering routing information for identifying a relaying path to a lower-level subscriber station for signal repetition via said subscriber station; and
    a third table for recording a frame format;
    wherein said communication controller comprises means for judging whether or not signal repetition is needed for communication between a different subscriber station and said base station, and means for automatically establishing a relaying path if it is judged that signal repetition is needed.

2. A subscriber station as claimed in claim 1, further comprising a receiving quality monitor for measuring reception quality of said incoming signal.

3. A subscriber station as claimed in claim 1, in which said communication controller comprises antenna management means for managing an antenna section used for transmitting and receiving signals, said antenna section comprises an antenna selector for making antenna selection according to a selection signal issued from said antenna management means and a plurality of directional antennas having respective directivities to different orientations, and said first table is provided for registering information on wireless station which serves as a clock supplier for said subscriber station when each of said plural directional antennas is used and for registering routing information for identifying a relaying path to a lower-level subscriber station for signal repetition via said subscriber station.

4. A subscriber station as claimed in claim 1, further comprising a timer section for indicating the upper limit of a period of searching for a wireless station serving as a clock supplier and the upper limit of a period of searching for a lower-level subscriber station to be connected with said subscriber station.

5. A subscriber station as claimed in claim 4, in which said communication controller comprises antenna management means for managing an antenna section used for transmitting and receiving signals, said antenna section comprises an antenna selector for making antenna selection according a selection signal issued from said antenna management means and a plurality of directional antennas having respective directivities to different orientations, and said first table is provided for registering information on wireless station which serves as a clock supplier for said subscriber station when each of said plural directional antennas is used and for registering routing information for identifying a relaying path to a lower-level subscriber station for signal repetition via said subscriber station,
    wherein said timer section comprises a first timer for indicating the upper limit of a period of searching for a wireless station serving as a clock supplier and a second timer for indicating the upper limit of a period of searching for a lower-level subscriber station to be connected with said subscriber station, and the upper limit of a period of searching for said lower-level subscriber station which is indicated by said second timer has a value greater than or equal to the product in multiplication of "the upper limit of a period of searching for said wireless station serving as a clock supplier which is indicated by said first timer" by "the maximum number of directional antennas equipped on said subscriber station".

6. An access method for a fixed wireless access system in which a plurality of subscriber stations carry out communication via a base station using a signal frame having a control channel, a communication channel and a reservation channel, said access method comprising the steps of:
    allowing at least one of said plural subscriber stations to be synchronized with said fixed wireless access system via said base station or a different subscriber station serving as a repeater in said fixed wireless access system;
    performing, from said subscriber station synchronized with said system, registration to an own reference wireless station thereof;
    checking, at said subscriber station synchronized with said system, whether or not to set up a relaying path;
    relaying, at said different subscriber station serving as a repeater, a control channel signal received from an own reference wireless station thereof to an own lower-level subscriber station thereof;

receiving, at said different subscriber station serving as a repeater, registration or repetition of registration from a different subscriber station for which said different subscriber station serving as a repeater is used as a reference wireless station, and transmitting, from said different subscriber station serving as a repeater, said registration or said repetition of registration to an own reference wireless station thereof;

relaying, at said different subscriber station serving as a repeater, origination from or termination to an own lower-level subscriber station thereof, and relaying, at said different subscriber station serving a repeater, a communication channel signal between aid base station and said lower-level subscriber station;

receiving, at said different subscriber station serving as a repeater, control channel reservation or repetition of control channel reservation from an own lower-level subscriber station thereof, and transmitting, from said different subscriber station serving as a repeater, said control channel reservation or said repetition of control channel reservation to an own reference wireless station thereof;

receiving, at said different subscriber station serving as a repeater, notification of the end of control channel use or repetition of notification of the end of control channel use from an own lower-level subscriber station thereof, and transmitting, from said different subscriber station serving as a repeater, said notification of the end of control channel use or said repetition of notification of the end of control channel use to an own reference wireless station thereof;

receiving, at said subscriber station synchronized with said system, termination to itself, processing origination from itself, and making re-registration in an own reference wireless station thereof;

monitoring, at said subscriber station synchronized with said system, a control channel signal transmitted from a wireless station different from an own reference wireless station thereof, and according to the result of said monitoring, making a changeover from said own reference wireless station to said different wireless station;

accepting, at said base station, registration or repetition of registration from a subscriber station;

allocating, at said base station, a control channel to a subscriber station;

deallocating, at said base station, a control channel thus allocated; and processing, at said base station, origination from or termination to a subscriber station.

* * * * *